US007788242B2

(12) United States Patent
Shavit et al.

(10) Patent No.: US 7,788,242 B2
(45) Date of Patent: Aug. 31, 2010

(54) METHOD AND SYSTEM FOR IMPLEMENTING A CONCURRENT SET OF OBJECTS

(75) Inventors: Nir N. Shavit, Cambridge, MA (US); Maurice Herlihy, Brookline, MA (US); Steven K. Heller, Burlington, MA (US); Victor M. Luchangco, Cambridge, MA (US); Mark S. Moir, Hampton, NH (US)

(73) Assignee: Oracle America, Inc., Redwood City, CA (US)

( * ) Notice: Subject to any disclaimer, the term of this patent is extended or adjusted under 35 U.S.C. 154(b) by 574 days.

(21) Appl. No.: 11/508,762

(22) Filed: Aug. 23, 2006

(65) Prior Publication Data

US 2008/0059470 A1 Mar. 6, 2008

(51) Int. Cl.
*G06F 17/00* (2006.01)
*G06F 7/00* (2006.01)

(52) U.S. Cl. ....................... 707/704; 707/716; 707/770; 707/781; 712/28; 718/107

(58) Field of Classification Search ....................... None
See application file for complete search history.

(56) References Cited

U.S. PATENT DOCUMENTS

| | | | | |
|---|---|---|---|---|
| 4,825,360 | A * | 4/1989 | Knight, Jr. | 718/106 |
| 6,247,025 | B1 * | 6/2001 | Bacon | 707/206 |
| 6,412,034 | B1 * | 6/2002 | Chan | 710/200 |
| 6,480,839 | B1 * | 11/2002 | Whittington et al. | 707/3 |
| 7,536,517 | B2 * | 5/2009 | Harris | 711/150 |

OTHER PUBLICATIONS

Simon Peyton Jones, Beautiful Concurrency, Microsoft Research, Cambridge, May 1, 2007, pp. 1-24.*

Maurice Herlihy and J. Eliot B. Moss, Transactional memory: architectural support for lock-free data structures, Proceedings of the 20th annual international symposium on Computer architecture (ISCA '93), vol. 21, Issue 2, May 1993.*

Nir Shavit and Dan Touitou, Software transactional memory, Distributed Computing, vol. 10, No. 2, Feb. 1997.*

Simon Peyton-Jones. Programming in the Age of Concurrency: Software Transactional Memory, Channel 9, http://channel9.msdn.com/ShowPost.aspx?PostID=231495, 2007.*

Dave Dice, Nir Shavit, What really makes transactions faster? Sun Microsystems Laboratories, pp. 1-11.*

Maurice Herlihy, Victor Luchangco, Mark Moir, and William N. Scherer III, Software Transactional Memory for Dynamic-Sized Data Structures. Proceedings of the Twenty-Second Annual ACM SIGACT-SIGOPS Symposium on Principles of Distributed Computing (PODC), Jul. 2003, pp. 92-102.*

(Continued)

*Primary Examiner*—Greta L Robinson
*Assistant Examiner*—James J Wilcox
(74) *Attorney, Agent, or Firm*—Osha • Liang LLP

(57) ABSTRACT

A method for inserting an object into a concurrent set including obtaining a key associated with the object, traversing the concurrent set using a first thread containing the key, identifying a first insertion point while traversing the concurrent set, where the first insertion point is before a current node and after a predecessor node, obtaining a first lock for the predecessor node after identifying the first insertion point, validating the predecessor node and the current node after obtaining the lock, inserting a new node into the concurrent set after validating, where the new node is associated with the object, and releasing the first lock after inserting the new node.

18 Claims, 7 Drawing Sheets

THREAD OBTAINS KEY VALUE STEP 410
START
RESET THREAD TO HEAD NODE STEP 420
NO
STEP 455
THREAD TRAVERSES SET FOR INSERTION POINT STEP 430
VALIDATION SUCCESSFUL ?
STEP 435
OBJECT ALREADY IN SET ?
YES
NO
INSERT NEW ENTRY NODE INTO SET STEP 460
NO
YES
THREAD LOCKS NODES STEP 440
RELEASE LOCKS STEP 470
THREAD VALIDATES NODES STEP 450
STOP

OTHER PUBLICATIONS

Tim Harris and Keir Fraser, Language Support for Lightweight Transactions, Object-Oriented Programming, Systems, Languages, and Applications, Oct. 2003, pp. 388-402.*

Tim Harris, Simon Marlow, Simon Peyton Jones, and Maurice Herlihy, Composable Memory Transactions, ACM Symposium on Principles and Practice of Parallel Programming 2005.*

Michael L. Scott, Lowering the Overhead of Nonblocking Software Transactional Memory, 2006.*

Torvald Riegel and Pascal Felber and Christof Fetzer, A Lazy Snapshot Algorithm with Eager Validation introduces the first time-based STM, 2006.*

Dave Dice, Ori Shalev, and Nir Shavit, Transactional Locking II, 2006.*

Knight, TF, An architecture for mostly functional languages, ACM Lisp and Functional Programming Conference, Aug. 1986.*

Dave Dice, Nir Shavit, Understanding Tradeoffs in Software Transactional Memory, IEEE Computer Society, 2007, pp. 1-13.*

Ali-Reza Adl-Tabatabai, Christos Kozyrakis, Bratin Saha, Unlocking concurrency, ACM Queue 4, 10 (Dec. 2006), pp. 24-33.*

James R Larus, Ravi Rajwar, Transactional Memory, Morgan and Claypool Publishers, 2006.*

Rajwar, Goodman, Transactional Lock-Free Execution of Lock Based Programs, Tenth International Conference on Architectural Support for Programming Languages and Operating Systems (ASPLOS), Oct. 6-Oct. 9, 2002, San Jose California, pp. 1-13.*

Herlihy, M. et al.; "Software Transactional Memory for Dynamic-Sized Data Structures", Jul. 13-16, 2003, 10 pages.

* cited by examiner

METHOD AND SYSTEM FOR IMPLEMENTING A CONCURRENT SET OF OBJECTS

BACKGROUND

In computer system design and programming, a "thread" or "thread of execution" is a sequence of instructions being executed by a processor. Many computer systems are configured to execute multiple threads concurrently. Each thread may access and/or modify a data structure running in the memory of the computer system. Data structures that can be accessed and/or modified by multiple threads concurrently may be referred to as concurrent data structures.

A concurrent set of objects is an example of a concurrent data structure. A concurrent set of objects may be considered a collection of objects within a computer program. There are at least three basic operations that may be performed by a thread on a set of objects: an inserting operation, which adds an object to the set; a removal operation, which removes an object from the set; and, a membership test operation, which determines whether an object belongs to the set.

SUMMARY

In general, in one aspect, the invention relates to a method for inserting an object into a concurrent set including obtaining a key associated with the object, traversing the concurrent set using a first thread containing the key, identifying a first insertion point while traversing the concurrent set, where the first insertion point is before a current node and after a predecessor node, obtaining a first lock for the predecessor node after identifying the first insertion point, validating the predecessor node and the current node after obtaining the lock, inserting a new node into the concurrent set after validating, where the new node is associated with the object, and releasing the first lock after inserting the new node.

In general, in one aspect, the invention relates to a method for removing an object from a concurrent set including obtaining a key associated with the object, traversing the set using a first thread containing the key, identifying a node in the concurrent set associated with the object while traversing, obtaining a first lock for the node, obtaining a second lock for a predecessor of the node, validating the node and the predecessor of the node after obtaining the first lock and the second lock, logically removing the node from the concurrent set after validating, physically removing the node from the concurrent set after logically removing the node, and releasing the first lock and the second lock after physically removing the node.

In general, in one aspect, the invention relates to a method for testing the membership of an object in a concurrent set including obtaining a key associated with the object, traversing the set using a first thread containing the key, comparing a first field of a node in the concurrent set with the key, and generating a response based on at least the comparison indicating the membership status of the object in the concurrent set.

In general, in one aspect, the invention relates to a system for implementing a concurrent set including a sentinel node, and a plurality of entry nodes representing a plurality of objects in the concurrent set, where each of the plurality of entry nodes is accessible from the sentinel node, where the sentinel node and the plurality of entry nodes are configured to be concurrently accessed by a plurality of optimistic operations, and where the sentinel node and the plurality of entry nodes are configured to be accessed by a membership test operation.

Other aspects of the invention will be apparent from the following description and the appended claims.

DETAILED DESCRIPTION

Figure 1:
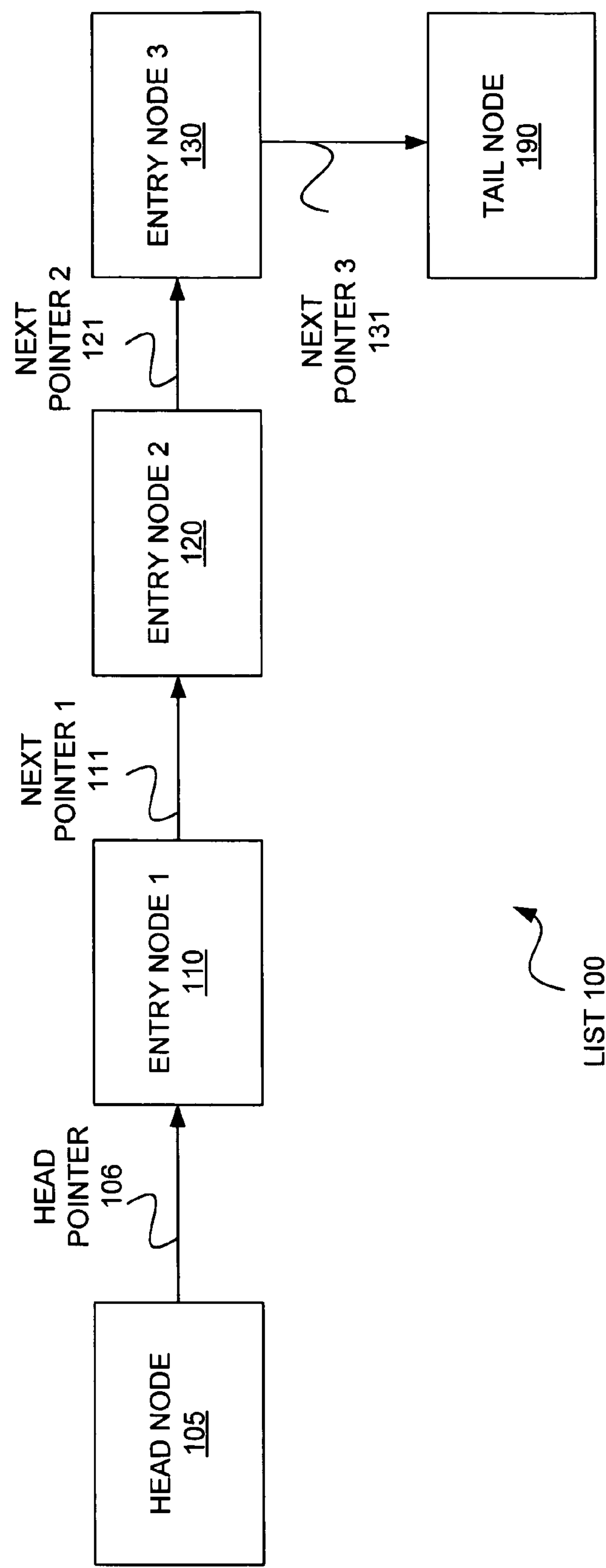
FIG. 1 shows a concurrent set of objects in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to implement a concurrent set of objects using nodes. In general, embodiments of the invention provide a method and system to implement a concurrent set of objects having membership test operations, insertion operations, and removal operations with optimistic traversals (discussed below).

FIG. 1 shows a concurrent set of objects (List (100)) in accordance with one or more embodiments of the invention. As shown in FIG. 1, List (100) includes multiple nodes (e.g., Head Node (105), Entry Node 1 (110), Entry Node 2 (120), Entry Node 3 (130), Tail Node (190)). In one or more embodiment of the invention, Head Node (105) and Tail Node (190) may be referred to as sentinel nodes. In one or more embodiments of the invention, all nodes in List (100) that are not sentinel nodes (e.g., Entry Node 1 (110), Entry Node 2 (120), Entry Node 3 (130)) may be referred to as entry nodes (discussed below).

Although one or more embodiments of the invention have been described as using lists (e.g., List (100) in FIG. 1), those skilled in the art, having the benefit of this detailed description, will appreciate other embodiments of the invention may use different data structures related to lists (e.g., a tree, a skiplist, etc.).

In one or more embodiments of the invention, each entry node (Entry Node 1 (110), Entry Node 2 (120), Entry Node 3 (130)) may represent an object in the concurrent set. As also shown in FIG. 1, each entry node may have a pointer variable (Next Pointer 1 (111), Next Pointer 2 (121), Next Pointer 3 (131)) pointing to the entry node's successor (e.g., Next Pointer 1 (111) points to Entry Node 2 (120)). Head Node (105) may have a pointer variable (i.e., Head Pointer (106)) pointing to the first entry node (Entry Node 1 (110)). The final entry node (Entry Node 3 (130)) may have a pointer variable (Next Pointer 3 (131)) pointing to Tail Node (190). In one or more embodiments of the invention, Tail Node (190) may have a pointer variable pointing to NULL (not shown). Those skilled in the art will appreciate that although FIG. 1 shows only three entry nodes, List (100) may have any number of entry nodes.

Figure 2:
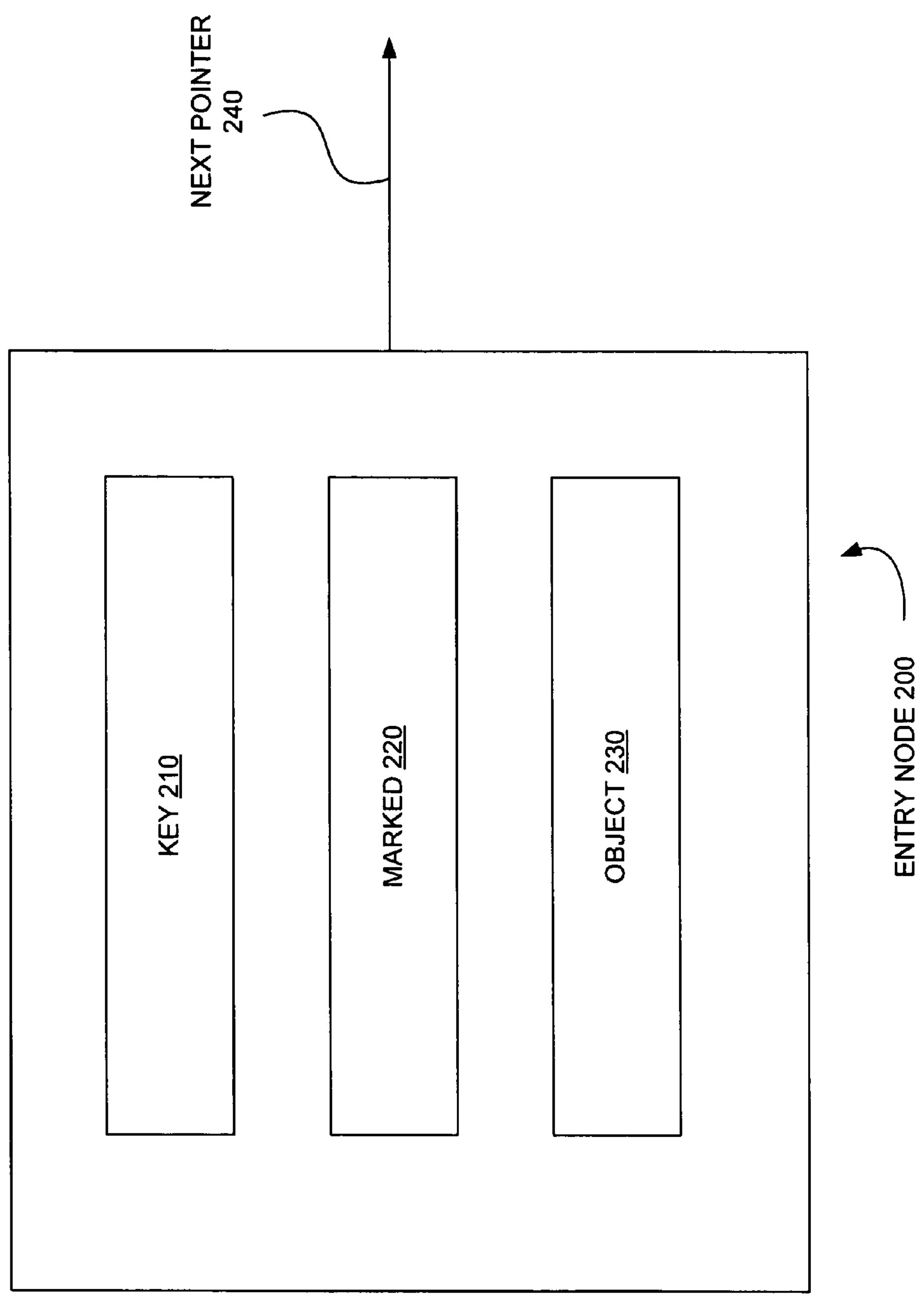
FIG. 2 shows an entry node in accordance with one or more embodiments of the invention.

FIG. 2 shows an entry node (Entry Node (200)) in accordance with one or more embodiments of the invention. As shown in FIG. 2, Entry Node (200) may have a key field (Key (210)), a marked field (Marked (220)), an object field (Object (230)), and a next pointer field (Next Pointer (240)). As discussed above, Entry Node (200) may represent an object in the concurrent set. Accordingly, Object (230) may be a pointer variable referencing the object represented by Entry Node (200). Further, Key (210) may be a numeric identification (e.g., an integer) or an alphanumeric identification of the object represented by Entry Node (200). In one or more embodiments of the invention, the value of Key (210) may be unique for each object. In one or more embodiments of the invention, the value of Key (210) may be the hashcode of the object represented by Entry Node (200). In one or more embodiments of the invention, the value of Key (210) may be the object, and thus Object (230) may not be required. In one or more embodiments of the invention, the entry nodes in the concurrent set (e.g., List (100) in FIG. 1) may be sorted in ascending or descending order based on their key field (Key (210)).

In one or more embodiments of the invention, the head node of the concurrent set (e.g., Head Node (105) in FIG. 1) may contain a key value (not shown). The key value contained in the head node may be smaller than the smallest key field value (Key (210)) of any entry node. In one or more embodiments of the invention, the tail node of the concurrent set (e.g., Tail Node (190) in FIG. 1) may contain a key value (not shown). The key value contained in the tail node may be larger than the largest key field value (Key (210)) of any entry node.

Still referring to FIG. 2, in one or more embodiments of the invention, Marked (220) may be a Boolean value indicating whether the object represented by Entry Node (200) logically belongs to the concurrent set or is marked for removal (discussed below). In other words, the value of Marked (220) may act as a confirmation that the object represented by Entry Node (220) is a member of the concurrent set. Next Pointer (240), as discussed above, may point to the successor of Entry Node (200) in the concurrent set.

Figure 3:
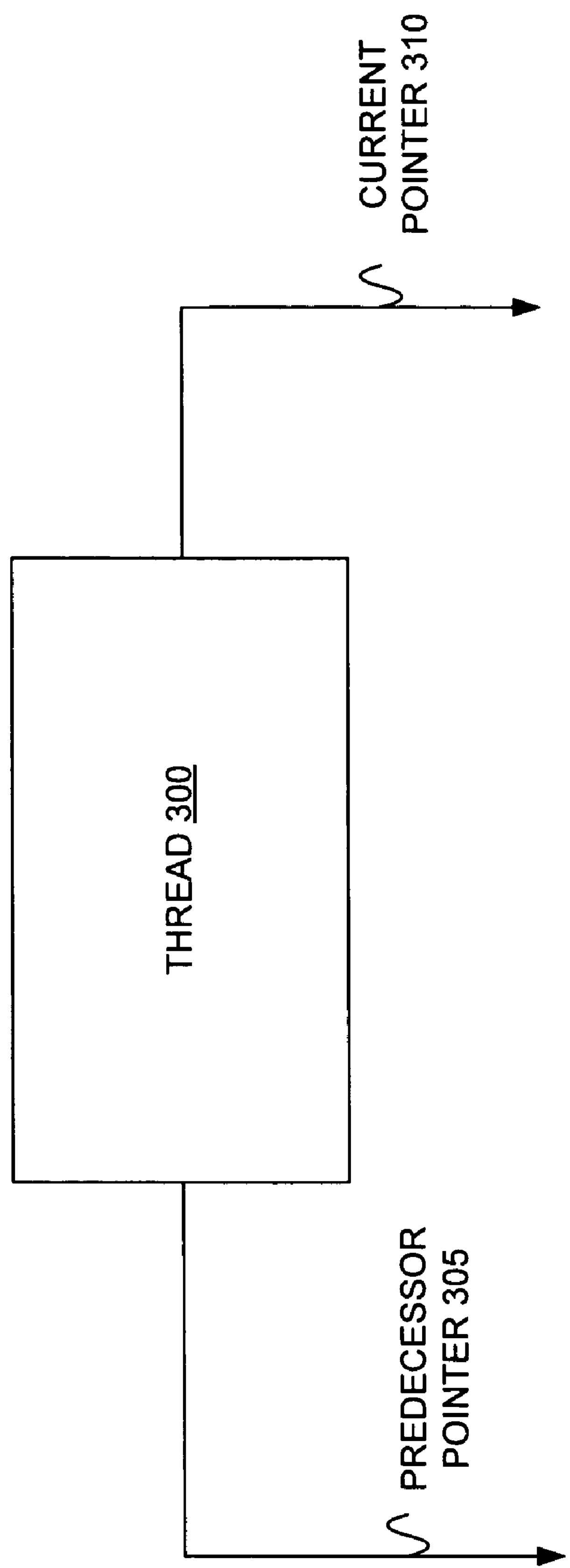
FIG. 3 shows a thread in accordance with one or more embodiments of the invention.

In one or more embodiments of the invention, an object may be inserted into the concurrent set, and/or removed from the concurrent set, and/or tested for membership in the concurrent set using one or more threads. FIG. 3 shows a thread (Thread (300)) in accordance with one or more embodiments of the invention. As shown in FIG. 3, Thread (300) may have a current pointer variable (Current Pointer (310)) (discussed below), a predecessor pointer variable (Predecessor Pointer (305)) (discussed below), in addition to other variables (not shown).

Figure 4:
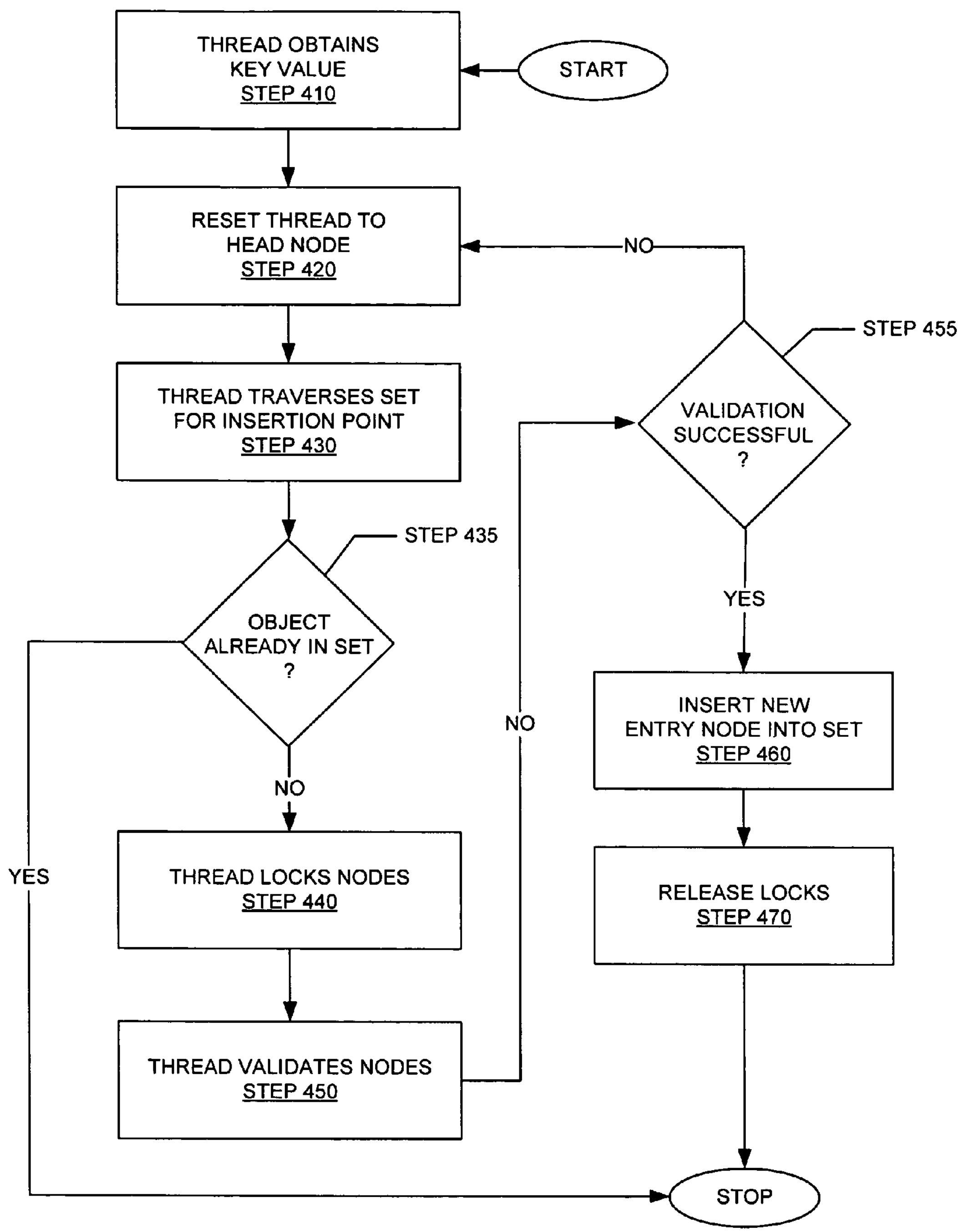
FIGS. 4, 5, and 6 show flowcharts in accordance with one or more embodiments of the invention.

FIG. 4 shows a flowchart for inserting an object into the concurrent set (e.g., List (100) in FIG. 1) in accordance with one or more embodiments of the invention. In STEP 410, a thread obtains the key identifying the object to be inserted. In STEP 420, the thread is reset to the head node of the concurrent set. In STEP 430, the thread traverses the concurrent set searching for an insertion point. In STEP 435, it is determined whether the object is already a member of the concurrent set. In STEP 440, the thread locks the one or more nodes in the concurrent set required for the insertion. In STEP 450, the thread validates the nodes involved with the insertion operation. In STEP 455, a determination is made whether the validation (STEP 450) was successful. If the validation fails, the one or more locks are released and the thread is reset to the head node (STEP 420). If the validation (STEP 450) is successful, the thread creates a new entry node and inserts the new entry node into the concurrent set at the insertion point (STEP 460). In STEP 470, the one or more locks are released. Each step is discussed in further detail below.

Initially, the thread obtains the key identifying the object to be inserted (STEP 410). As discussed above, the key identifying the object may be a numeric value (e.g., an integer) or an alphanumeric value. In one or more embodiments of the invention, the key identifying the object may be the hashcode of the object. In one or more embodiments of the invention, the key identifying the object may be unique. In other words, each object may have a unique key value. In one or more embodiments of the invention, the key itself may be the object.

In STEP 420, the thread is reset to the head node of the concurrent set. In one or more embodiments of the invention, resetting the thread involves pointing the predecessor pointer (e.g., Predecessor Pointer (305) in FIG. 3) to the head node and pointing the current pointer (e.g., Current Pointer (310) in FIG. 3) to the successor of the head node. Those skilled in the art, having the benefit of this detailed description, will appreciate the reset step (STEP 420) forces a thread (e.g., Thread (300)) to traverse the concurrent set starting from the head node.

In STEP 430, the thread traverses (i.e., moves down) the concurrent set searching for an insertion point. In one or more embodiments of the invention, the thread may traverse the concurrent set by pointing the predecessor pointer to the entry node presently referenced by the current pointer, and by pointing current pointer to the successor node of the entry node presently referenced by the current pointer. For example, if Predecessor Pointer (305) in FIG. 3 presently points to Head Node (105) in FIG. 1, and Current Pointer (310) in FIG. 3 presently points to Entry Node 1 (110) in FIG. 1, Thread (300) in FIG. 3 may start traversing List (100) in FIG. 1 by pointing Predecessor Pointer (305) to Entry Node 1 (110) and Current Pointer (310) to Entry Node 2 (120). The adjusting of the pointer variables (e.g., Predecessor Pointer (305) in FIG. 3 and Current Pointer (310) in FIG. 3) may be repeated in order for the thread to traverse concurrent set. In one or more embodiments of the invention, the thread may reset to the head node (STEP 420) if the thread encounters a NULL pointer during traversal of the concurrent set (discussed below).

As discussed above, in one or more embodiments of the invention, the entry nodes in the concurrent set are sorted in ascending order by their key field (e.g., Key (210) in FIG. 2). In other words, the entry node with the smallest key field value is closest to the head node. In one or more embodiments of the invention, the thread locates an insertion point by comparing the key field value of the entry node referenced by the current pointer with the key identifying the object to be inserted. If the key field value of the entry node referenced by the current pointer matches the key identifying the object to be inserted, the object is already present in the concurrent set (STEP 435). In such cases, a Boolean response (e.g., "false") may be returned by the insertion operation and the insertion operation may be aborted. In one or more embodiments of the invention, the insertion point may be identified as the location in the concurrent set where, for the first time, the entry node referenced by the current pointer has a key field value exceeding the key of the object to be inserted. Those skilled in the art will appreciate the insertion point may be selected to maintain the sorted order of the concurrent set.

In STEP 440, the thread locks the nodes in the concurrent set required for the insertion operation. In one or more embodiments of the invention, the thread locks the node referenced by the predecessor pointer. In one or more embodiments of the invention, the thread locks the node referenced by predecessor pointer and the node referenced by current pointer. In one or more embodiments of the invention, one or more fields of a locked node (e.g., Key (210) in FIG. 2, Marked (220) in FIG. 2, Object (230) in FIG. 2, etc.) remain viewable to other threads traversing the concurrent set. In one or more embodiments of the invention, a thread wishing to acquire a lock for an already locked (i.e., by another thread) node must wait until the existing lock is released. In one or more embodiments of the invention, the lock for a particular node may be in the node itself, a single global lock, or any consistent mapping from nodes to locks.

In STEP 450, the thread validates the nodes referenced by the predecessor pointer and the current pointer. In one or more embodiments of the invention, the nodes referenced by the predecessor pointer and the current pointer may be considered validated if the marked field (e.g., Marked (220) in FIG. 2) of both nodes is set to "false" and the node referenced by the current pointer is the successor (i.e., immediately follows) the node referenced by the predecessor pointer. In one or more embodiments of the invention, the marked field indicates whether an entry node has been logically removed from the concurrent set (discussed below). In STEP 455, it is determined whether the nodes were successfully validated. If validation is not successful, the locks (STEP 440) may be released and the process returns to the reset step (STEP 420). If validation is successful, the process continues to STEP 460.

In one or more embodiments of the invention, the thread may perform a pre-validation of the nodes referenced by the predecessor pointer and the current pointer prior to acquiring the one or more locks. Pre-validating the nodes is essentially the same as validating the nodes as described above in reference to FIG. 4, STEP 450. If pre-validation is unsuccessful, the process may return to the reset step (STEP 420).

In STEP 460, the thread initializes a new entry node and inserts it into the concurrent set. The new entry node may be initialized by setting its object pointer (e.g., Object (230) in FIG. 2) to reference the object to be inserted, by setting its key field (e.g., Key (210) in FIG. 2) to the key identifying the object to be inserted, by setting its marked field (e.g., Marked (220) in FIG. 2) to "false", and by setting its next pointer field to reference the node presently being reference by the current pointer. In one or more embodiments of the invention, the value of the key field may be the object, and thus the object pointer may not be required. In one or more embodiments of the invention, the next pointer field of the node being referenced by the predecessor pointer is pointed to the new entry node. In STEP 470, the one or more locks on the one or more nodes are released. In one or more embodiments of the invention, a Boolean response (e.g., "true") is returned by the operation following a successful insertion.

Those skilled in the art, having the benefit of this detailed description, will appreciate that the insertion operation has an optimistic traversal process. In other words, a thread executing an insertion operation traverses the concurrent set without interfering with other threads and without acquiring any locks or validating any nodes until the insertion point has been identified (STEP 440).

Figure 5:
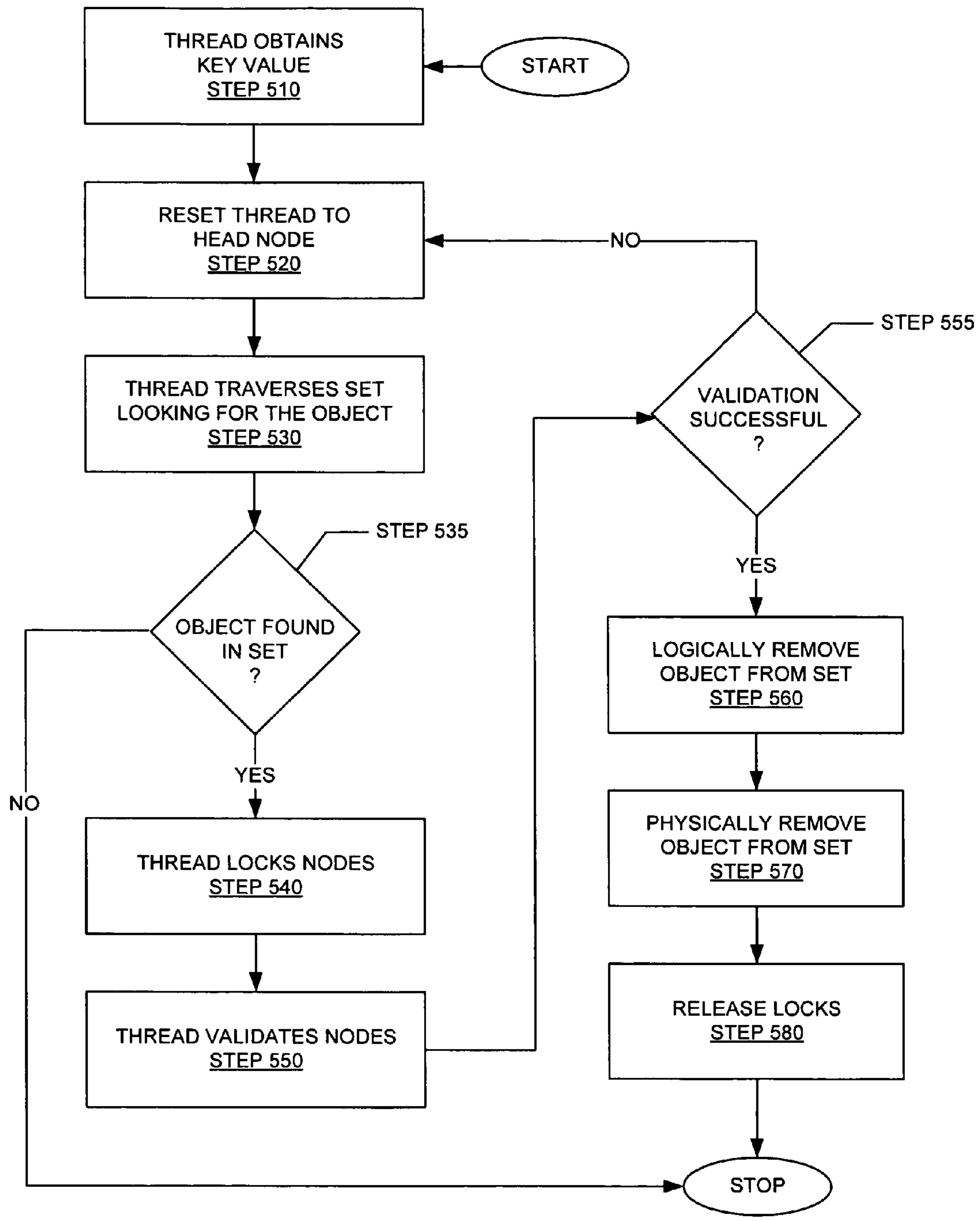

FIG. 5 shows a flowchart for removing an object from the concurrent set in accordance with one or more embodiments of the invention. In STEP 510, a thread obtains the key identifying the object to be removed. In STEP 520, the thread is reset to the head node of the concurrent set. In STEP 530, the thread traverses the concurrent set searching for the entry node representing the object to be removed. In STEP 535, it is determined whether the object is a member of the concurrent set. In STEP 540, the thread locks the nodes required for the removal operation. In STEP 550, the thread validates the locked nodes. In STEP 555, a determination is made whether the validation (STEP 550) was successful. If the validation fails, the one or more locks are released and the thread is reset to the head node (STEP 520). If the validation (STEP 550) is successful, the thread first logically removes the object from the concurrent set (STEP 560) and then physically removes the object from the concurrent set (STEP 570). In STEP 580, the one or more locks are released. Each step is discussed in further detail below.

Initially, the thread obtains the key identifying the object to be removed (STEP 510). STEP 510 is essentially the same as STEP 410 in FIG. 4, except the key obtained by the thread in STEP 510 identifies the object to be removed. In one or more embodiments of the invention, the key itself may be the object. In STEP 520, the thread is reset to the head node. STEP 520 is essentially the same as STEP 420 in FIG. 4.

In STEP 530, the thread traverses (i.e., moves down) the concurrent set searching for the object to be removed. In one or more embodiments of the invention, the thread may traverse the concurrent set by pointing its predecessor pointer to the entry node presently referenced by the current pointer, and by pointing the current pointer to the successor node of the entry node presently referenced by the current pointer. STEP 530 is essentially the same as STEP 430 in FIG. 4. In one or more embodiments of the invention, the thread may reset to the head node (STEP 520) if the thread encounters a NULL pointer during traversal of the concurrent set (discussed below).

As discussed above, in one or more embodiments of the invention, the entry nodes in the concurrent set are sorted in ascending order by their key field value (e.g., Key (210) in FIG. 2). In other words, the entry node with the smallest key field value is closest to the head node (e.g., Head Node (105) in FIG. 1). In one or more embodiments of the invention, the thread locates the object to be removed by comparing the key field of the entry node referenced by the current pointer with the key identifying the object to be removed. In one or more embodiments of the invention, if the object to be removed is not found (STEP 535), a Boolean response (e.g., "false") may be returned by the removal operation. In one or more embodiments of the invention, when the entry nodes are sorted by key field, a Boolean value of "false" may be returned and the operation aborted when the thread finds an entry node with a key field exceeding the key of the object to be removed.

In STEP 540, the thread locks the nodes required for the removal operation. In one or more embodiments of the invention, the thread locks the nodes referenced by the predecessor pointer and the current pointer, where the entry node referenced by the current pointer is the entry node representing the object to be removed. In one or more embodiments of the invention, one or more fields of a locked node (e.g., Key (210) in FIG. 2, Marked (220) in FIG. 2, Object (230) in FIG. 2, etc.) remain viewable to other threads traversing the concurrent set. In one or more embodiments of the invention, a thread wishing to acquire a lock for an already locked (i.e., by another thread) node must wait until the existing lock is released. In one or more embodiments of the invention, the lock for a particular node may be in the node itself, a single global lock, or any consistent mapping from nodes to locks.

In STEP 550, the thread validates the locked nodes. STEP 550 is essentially the same as STEP 450 in FIG. 4. In STEP 555, it is determined whether the nodes were successfully validated. If validation is not successful, the one or more locks (STEP 540) may be released and the process returns to the reset step (STEP 520). If validation is successful, the process continues to STEP 560.

In one or more embodiments of the invention, the thread may perform a pre-validation of the nodes referenced by the predecessor pointer and the current pointer prior to acquiring the one or more locks. Pre-validating the nodes is essentially the same as validating the nodes as described above in reference to FIG. 5, STEP 550. If pre-validation is unsuccessful, the process may return to the reset step (STEP 520).

In STEP 560, the thread may logically remove the object from the concurrent set. In one or more embodiments of the invention, an object may be logically removed by setting a pointer variable (e.g., Next Pointer (240) in FIG. 2) of the entry node associated with the object to be removed to NULL. It is possible that a second thread, performing a second operation, may encounter this NULL pointer while traversing the concurrent and may reset to the head node (e.g., STEP 520 in FIG. 5, STEP 420 in FIG. 4, etc.) as a result.

In one or more embodiments of the invention, an object may be logically removed by setting the marked field (e.g., Marked (220) in FIG. 2) of the entry node referencing the object to be removed to "true". In STEP 570, the thread may physically remove the object from the concurrent set. In one or more embodiments of the invention, an object may be physically removed by setting the next pointer of the entry node referenced by the predecessor pointer to the successor node of the entry node referenced by the current pointer. For example, referring to FIG. 1, if the object associated with Entry Node 2 (120) was to be physically removed, Current Pointer (310) in FIG. 3 may be pointing to Entry Node 2 (120) and Predecessor Pointer (305) in FIG. 3 may be pointing to Entry Node 1 (110). Next Pointer 1 (111) may then be set to point to Entry Node 3 (130) to physically remove Entry Node 2 (120). In STEP 580, the locks on the nodes are released. In one or more embodiments of the invention, a Boolean response (e.g., "true") may be returned by the operation following a successful removal.

Those skilled in the art, having the benefit of this detailed description, will appreciate that the removal operation has an optimistic traversal process. In other words, a thread executing a removal operation traverses the concurrent set without interfering with other threads and without acquiring any locks or validating any nodes until the entry node representing the object to be removed has been identified (STEP 540).

Figure 6:
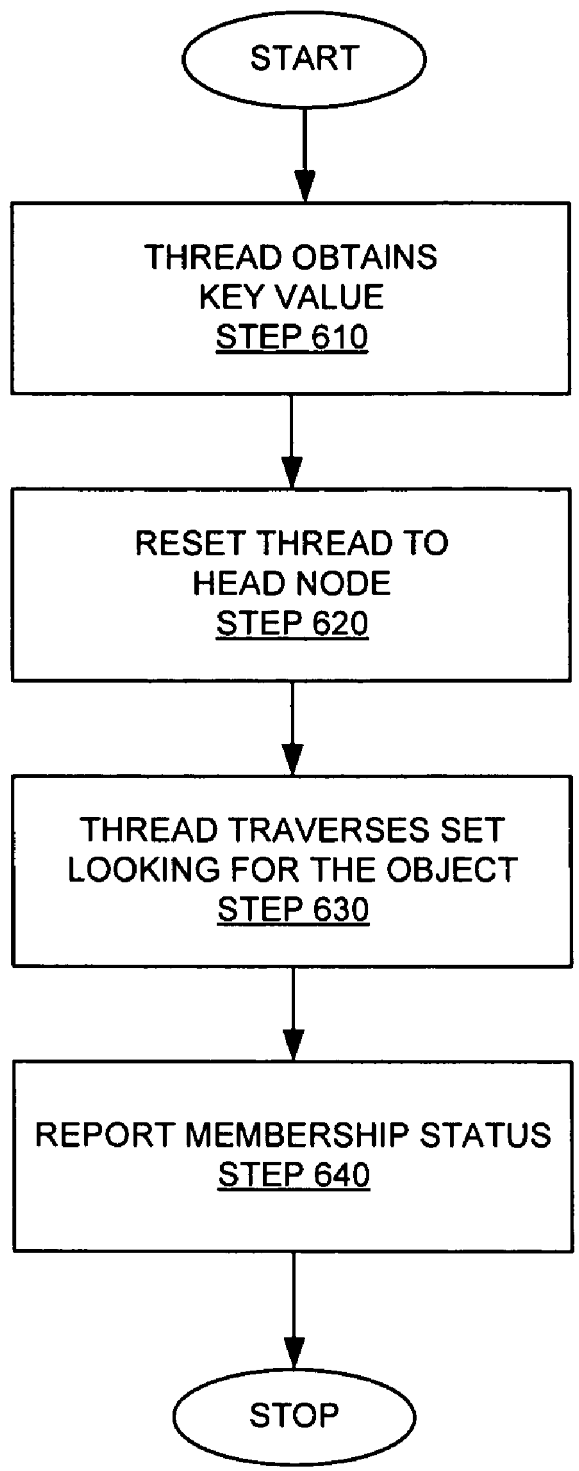

FIG. 6 shows a flowchart for performing a membership test operation in accordance with one or more embodiments of the invention. In STEP 610, a thread obtains the key identifying the object requiring a membership test. In STEP 620, the thread is reset to the head node. In STEP 630, the thread traverses the concurrent set searching for the object. In STEP 640, a Boolean value is reported indicating the membership status of the object. Each step is discussed in further detail below.

Initially, the thread obtains the key identifying the object requiring a membership test (STEP 610). STEP 610 is essentially the same as STEP 410 in FIG. 4, except the key obtained by the thread in STEP 610 identifies the object requiring a membership test. In one or more embodiments of the invention, the key itself may be the object. In STEP 620, the thread is reset to the head node. STEP 620 is essentially the same as STEP 420 in FIG. 4, except the use of the predecessor pointer may not be required.

In STEP 630, the thread traverses the concurrent set. In one or more embodiments of the invention, the thread traverses the concurrent set by setting the current pointer to the successor node of the present node being referenced by the current pointer. This adjustment of the current pointer variable may be repeated, effectively allowing the thread to traverse the concurrent set. In one or more embodiments of the invention, the thread may reset to the head node (STEP 620) when the thread encounters a NULL during traversal of the concurrent set (discussed above).

In one or more embodiments of the invention, while traversing the concurrent set, the thread compares the key field (e.g., Key (210) in FIG. 2) of the entry node referenced by the current pointer with the key of the object requiring the membership test. If a match is found and the entry node containing the matching key field is not marked for removal (i.e., the marked field is to "false"), a Boolean value of "true" may be returned by the operation (STEP 640) to indicate the object is a member. If a match is not found or the entry node containing the matching Key (210) is marked for removal (i.e., Marked (220) is set to "true"), the object requiring a membership test is not a member. Accordingly, a Boolean value of "false" may be returned by the operation (STEP 640). In one or more embodiments of the invention, when the entry nodes are sorted by key field, a Boolean value of "false" may be returned by the operation (STEP 640) when the thread finds an entry node with a key field exceeding the key of the object requiring a membership test.

Those skilled in the art, having the benefit of this detailed description, will appreciate that a membership test operation may execute without acquiring any locks, and without validating any nodes. Further, if all removal operations logically remove nodes by changing the marked field (i.e., NOT by using a NULL pointer), or if removal operations are nonexistent, the membership test operation is guaranteed to complete after a finite number of steps. Accordingly, in such embodiments, the membership test operation may be described as wait-free.

Figure 7:
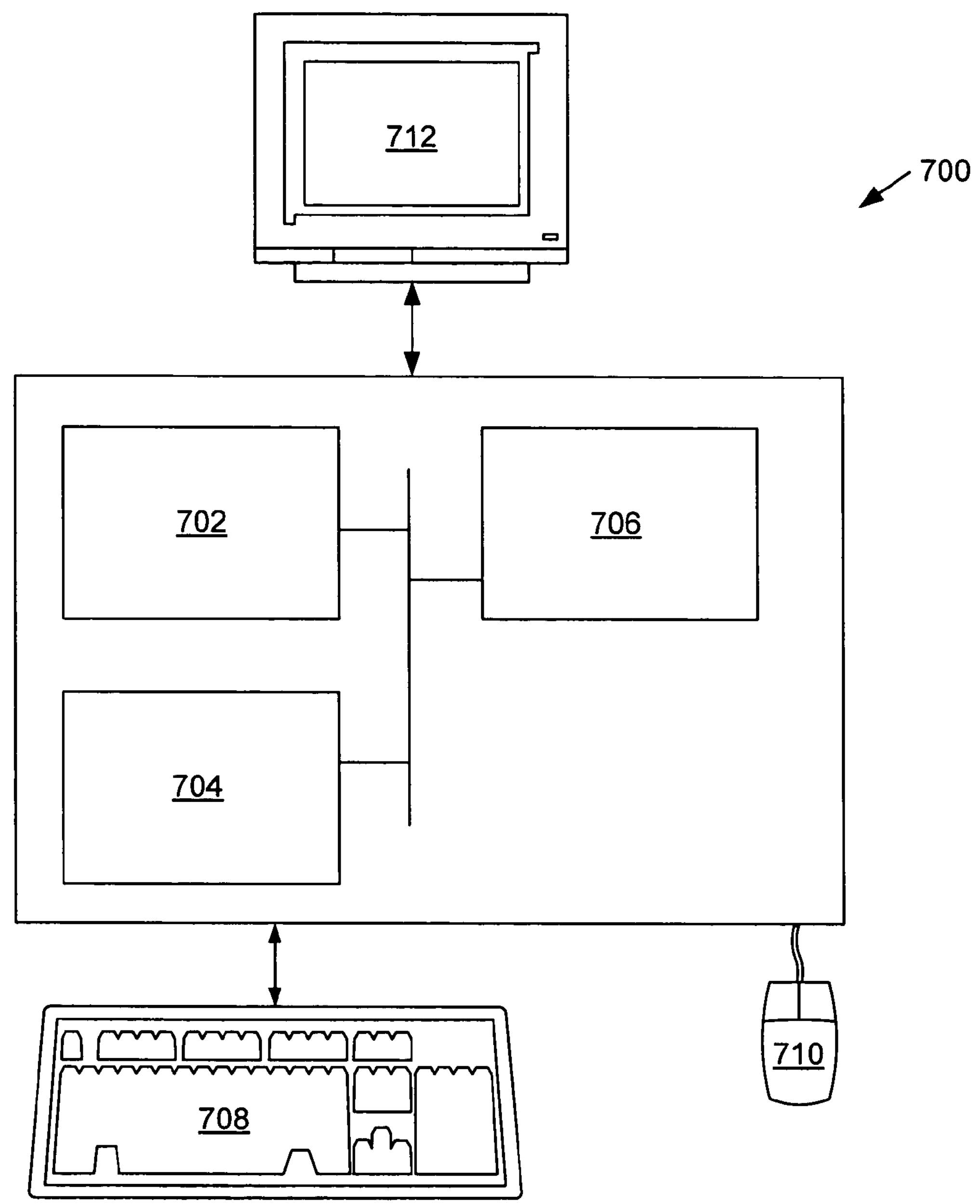
FIG. 7 shows a computer system in accordance with one or more embodiments of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) may be connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inserting an object into a concurrent set in memory, the method comprising:

obtaining a key associated with the object;

traversing the concurrent set in memory using a first thread containing the key, wherein the first thread is executed as a first sequence of instructions on a processor;

traversing the concurrent set in memory using a second thread, wherein the second thread is executed as a second sequence of instructions on the processor, and wherein the second thread executes a concurrent operation concurrently with the first thread;

identifying a first insertion point while traversing the concurrent set in memory, wherein the first insertion point is before a current node and after a predecessor node;

obtaining a first lock for the predecessor node after identifying the first insertion point;

validating the predecessor node and the current node by:

confirming, after obtaining the first lock, that the current node and the predecessor node are logical members of the concurrent set in memory by checking a marked field, and confirming that the current node is a successor of the predecessor node;

inserting, while the predecessor node is locked, a new node into the concurrent set in memory after validating, wherein the new node is associated with the object; and releasing the first lock after inserting the new node.

2. The method of claim 1, wherein the concurrent operation executed by the second thread is a membership test operation.

3. The method of claim 1, wherein traversing the concurrent set in memory comprises:

following a pointer variable from a head node of the concurrent set in memory.

4. The method of claim 1, wherein the first thread obtains a second lock for the current node.

5. The method of claim 1, further comprising:

pre-validating the predecessor node and the current node prior to obtaining the first lock.

6. The method of claim 1, wherein at least a part of the concurrent set in memory is traversed by the first thread while not locked by the first thread.

7. The method of claim 1, wherein the concurrent set in memory uses a list.

8. A method for removing an object from a concurrent set in memory, the method comprising:

obtaining a key associated with the object;

traversing the concurrent set in memory using a first thread containing the key, wherein the first thread is executed on a processor as a first sequence of instructions;

traversing the concurrent set in memory using a second thread, wherein the second thread is executed as a second sequence of instructions on the processor, and wherein the second thread executes a concurrent operation concurrently with the first thread;

identifying a node in the concurrent set in memory associated with the object while traversing;

obtaining a first lock for the node;

obtaining a second lock for a predecessor of the node;

validating the node and the predecessor of the node by:

confirming, after obtaining the first and second lock, that the node and the predecessor of the node are logical members of the concurrent set in memory by checking a marked field, and confirming that the node is a successor of the predecessor of the node;

logically removing the node from the concurrent set in memory after validating;

physically removing the node from the concurrent set in memory after logically removing the node; and releasing the first lock and the second lock after physically removing the node.

9. The method of claim 8, wherein logically removing the node comprises:

changing a field of the node.

10. The method of claim 8, wherein logically removing the node comprises:

changing a pointer variable of the node.

11. The method of claim 8, wherein physically removing the node comprises:

changing a pointer variable of the predecessor of the node.

12. The method of claim 8, further comprising:

pre-validating the node and the predecessor of the node prior to obtaining the first lock.

13. The method of claim 8, wherein the concurrent set in memory uses a list.

14. The method of claim 8, wherein at least a part of the concurrent set in memory is traversed by the first thread while not locked by the first thread.

15. A method for testing the membership of an object in a concurrent set in memory, the method comprising:

obtaining a key associated with the object;

traversing the concurrent set in memory using a first thread containing the key, wherein the first thread is executed on a processor as a first sequence of instructions;

traversing the concurrent set in memory using a second thread to execute a concurrent operation using locks, wherein the second thread is executed as a second sequence of instructions on the processor;

comparing a first field of a node in the concurrent set in memory with the key;

confirming that the node belongs to the concurrent set in memory; and generating a response based on the comparison indicating the membership status of the object and confirmation that the node belongs in the concurrent set in memory.

16. The method of claim 15, wherein the concurrent set in memory uses a list.

17. The method of claim 15, wherein at least a part of the concurrent set in memory is traversed by the first thread while not locked by the first thread.

18. The method of claim 15, wherein the concurrent operation executed by the second thread is an insert operation.

* * * * *